(12) United States Patent
Lundh

(10) Patent No.: US 6,690,936 B1  
(45) Date of Patent: Feb. 10, 2004

(54) AIR-INTERFACE EFFICIENCY IN WIRELESS COMMUNICATION SYSTEMS

(75) Inventor: Peter Lundh, Skarholmen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 196 days.

(21) Appl. No.: 09/702,516

(22) Filed: Oct. 31, 2000

(51) Int. Cl.[7] ................................................. H04Q 7/20
(52) U.S. Cl. ....................... 455/436; 455/438; 455/439; 455/442; 455/443; 455/444; 370/331; 370/332; 370/335; 370/342; 370/441
(58) Field of Search ..................... 455/436, 438, 455/439, 442, 443, 444; 370/331, 332, 335, 342, 441

(56) References Cited

U.S. PATENT DOCUMENTS

| | | | |
|---|---|---|---|
| 4,799,252 A | * 1/1989 | Eizenhoffer et al. | 370/330 |
| 5,483,668 A | 1/1996 | Malkamaki et al. | 455/3.2 |
| 5,652,748 A | 7/1997 | Jolma et al. | 370/320 |
| 5,673,260 A | 9/1997 | Umeda et al. | 370/342 |
| 5,682,416 A | 10/1997 | Schmidt et al. | 379/58 |
| 5,790,534 A | 8/1998 | Kokko et al. | 370/335 |
| 5,828,659 A | 10/1998 | Teder et al. | 370/328 |
| 6,078,570 A | 6/2000 | Czaja et al. | 370/331 |
| 6,078,571 A | * 6/2000 | Hall | 370/331 |
| 6,507,741 B1 | * 1/2003 | Bassirat | 455/440 |

FOREIGN PATENT DOCUMENTS

| | | |
|---|---|---|
| EP | 0 577 322 | 1/1994 |
| EP | 0 902 551 | 3/1999 |
| WO | WO 00/36867 | 6/2000 |

OTHER PUBLICATIONS

RS 106045 US; Completed May 17, 2001.

* cited by examiner

*Primary Examiner*—William Trost  
*Assistant Examiner*—Danh Le (57) ABSTRACT

A greater variety of frequency combinations may be utilized in multiple situations, including, by way of example but not limitation, hard handovers, soft handovers, macrodiversity, etc. Soft handovers, for example, may be executed between two base stations (BSs) with respect to a mobile station (MS) in which the uplink (UL) and downlink (DL) frequency pairs used to communicate with each base station differ from each other. For instances, only the UL carrier channel, only the DL carrier channel, or both the UL and the DL carrier channels may differ for the respective communications between the MS and the respective BSs. In the first two cases in which only one carrier channel differs, variable duplex distance (VDD) is implemented. In the third case in which both carrier channels differ, constant duplex distance (CDD) is implemented. In another embodiment of the present invention, a hard handover that relies on a VDD implementation is effectuated by changing only one of the UL and the DL carrier channels in the handover process.

47 Claims, 6 Drawing Sheets

| | |
|---|---|
| Cell1 | Source cell |
| Cell2 | Target cell (at SHO or HHO) |
| DL | Downlink (forward) |
| UL | Uplink (reverse) |
| $f_{1x}$ | Frequency in cell 1 |
| $f_{2x}$ | Frequency in cell 2 |
| Carrier | Synonym to Frequency |
| SHO | Soft-handover (being connected to more than one cell) |
| IF | Inter-Frequency |
| HHO | Hard-handover |
| $f_{x1}$ | First frequency in UL band |
| $f_{x2}$ | Second frequency in UL band |
| $f_{x3}$ | First frequency in DL band |
| $f_{x4}$ | Second frequency in DL band |
| IF | Inter Frequency |
| CDD | Constand Duplex Distance |
| VDD | Variable Duplex Distance |

| Cell1 | Source cell | HHO | Hard-handover |
| Cell2 | Target cell (at SHO or HHO) | $f_{x1}$ | First frequency in UL band |
| DL | Downlink (forward) | $f_{x2}$ | Second frequency in UL band |
| UL | Uplink (reverse) | $f_{x3}$ | First frequency in DL band |
| $f_{1x}$ | Frequency in cell 1 | $f_{x4}$ | Second frequency in DL band |
| $f_{2x}$ | Frequency in cell 2 | IF | Inter Frequency |
| Carrier | Synonym to Frequency | CDD | Constand Duplex Distance |
| SHO | Soft-handover (being connected to more than one cell) | VDD | Variable Duplex Distance |

FIG. 3

| Cell1 | Source cell | IF | Inter-Frequency |
| --- | --- | --- | --- |
| Cell2 | Target cell (at SHO or HHO) | HHO | Hard-handover |
| DL | Downlink (forward) | $f_{x1}$ | First frequency in UL band |
| UL | Uplink (reverse) | $f_{x2}$ | Second frequency in UL band |
| $f_{1x}$ | Frequency in cell 1 | $f_{x3}$ | First frequency in DL band |
| $f_{2x}$ | Frequency in cell 2 | $f_{x4}$ | Second frequency in DL band |
| Carrier | Synonym to Frequency | IF | Inter Frequency |
| SHO | Soft-handover (being connected to more than one cell) | CDD | Constant Duplex Distance |
|  |  | VDD | Variable Duplex Distance |

|  | FIRST CARRIER SET | SECOND CARRIER SET | Nth CARRIER SET |
|---|---|---|---|
| 560 — CDD | UL1  DL3 | UL2  DL4 | ... |
| 570¹ — VDD#1 | UL1  DL3 | UL2  DL3 | ... |
| 570ⁿ — VDD#2 | UL1  DL3 | UL1  DL4 | ... |
| ⋮ | ⋮ | ⋮ | ⋮ |

AIR-INTERFACE EFFICIENCY IN WIRELESS COMMUNICATION SYSTEMS

BACKGROUND OF THE INVENTION

1. Technical Field of the Invention

The present invention relates in general to the field of wireless communication systems, and in particular, by way of example but not limitation, to inter-frequency communications in wireless communication systems.

2. Description of Related Art

Access to wireless networks is becoming increasingly important and popular for business, social, and recreational purposes. Users of wireless networks now rely on them for both voice and data communications. Additionally, an ever increasing number of users demand both an increasing array of services and capabilities as well as greater and greater bandwidth for activities such as Internet surfing. To remedy the congestion caused by additional subscribers and to address demands for greater bandwidth, the wireless communications industry constantly strives to improve the number of services and the capacity of their wireless networks. Expanding and improving the infrastructure necessary to provide additional capacity and a larger coverage area is an expensive and manpower-intensive undertaking.

Nevertheless, the wireless communications industry continues to improve the capabilities of the technology upon which it relies as well as to increase the amount of technology deployed and made available to its customers. It is predicted that eventually one hurdle for growing the capacity of wireless systems will be the air-interface. In fact, the air-interface may eventually be optimized within what is possible between the standard walls. The air-interface will therefore be the bottleneck in public land mobile networks (PLMNs) (e.g, based on standards such as the Universal Mobile Telecommunications System (UMTS), Wide-band Code Division Multiple Access (WCDMA), etc.). As the air-interface becomes a primary, or even the primary, roadblock to continued wireless growth, improvements thereto will become increasingly important and valuable to the wireless communications industry.

SUMMARY OF THE INVENTION

Deficiencies of prior art air-interfaces are overcome by the methods, systems, and arrangements of the present invention. For example, as heretofore unrecognized, it would be beneficial to expand beyond the standard defined carrier channel pairs. In fact, it would be beneficial if such channel expansion also enabled contemporaneous transmission and reception on multiple frequencies to further increase the flexibility and efficiency of an air-interface.

In various exemplary situations (e.g., hard handovers, soft handovers, macrodiversity, primarily data reception communications (e.g., Internet surfing), etc.), a remote communication station (e.g., a mobile station) is engaged in inter-frequency (IF) communication with one or more communication stations (e.g., base stations). In an exemplary soft handover situation, a remote communication station is in substantially contemporaneous communication with two communication stations using two different carrier sets. In an exemplary hard handover situation, a remote communication station switches from communicating with a first base station using a first carrier set to communicating with a second base station using a second carrier set, the first and second carrier sets differing, but differing only partially. In an exemplary primarily data reception communication situation, a remote communication station participates in a handover with one or more communication stations between two different downlink carriers while retaining an uplink carrier.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

A preferred embodiment of the present invention and its advantages are best understood by referring to FIGS. 1–6 of the drawings, like numerals being used for like and corresponding parts of the various drawings.

Aspects of the Wideband Code Division Multiple Access (WCDMA) standard, as well as GSM systems, are used to describe embodiments of the present invention. However, it should be understood that the principles of the present invention are applicable to other wireless communication standards (or systems), especially those in which the air-interface is sub-optimal as compared to the nodes, both the mobile stations and the base stations, for example.

Figure 1:
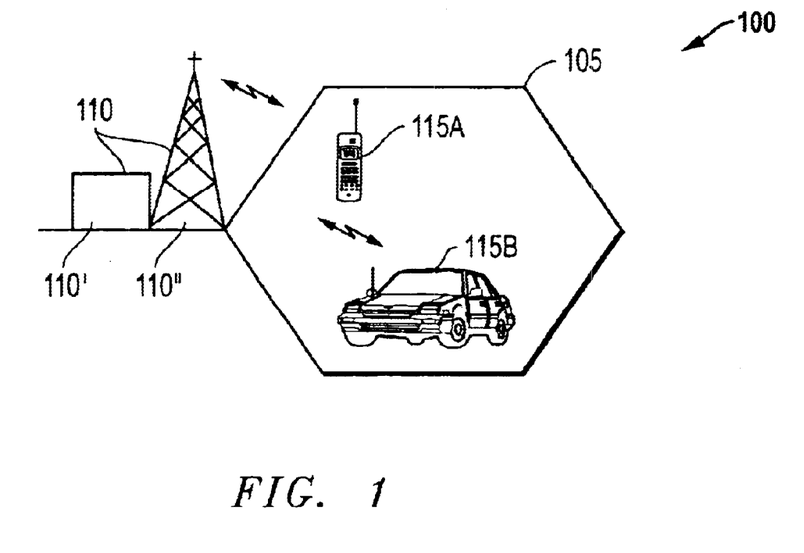
FIG. 1 illustrates an exemplary portion of an exemplary wireless communications system with which the present invention may be advantageously practiced.

With reference now to FIG. 1, a portion of an exemplary wireless communications system with which the present invention may be advantageously employed is illustrated generally at 100. The (portion of) wireless communications system 100 includes a cell 105 that is served by a base station (BS) 110. The BS 110 may be composed of or affiliated with a radio base station (RBS) 110" (e.g., a base transceiver station (BTS) in GSM), a radio network controller (RNC) 110' (e.g., a base station controller (BSC) in GSM), and/or other network-side components of the wireless communications system 100. Within the cell 105 are multiple mobile stations (MSs) 115A and 115B, each of which may be in communication with the wireless network infrastructure as represented by the BS 110. Each MS 115 may be, for example, a hand-held cellular phone (e.g., the MS 115A), a vehicle-mounted MS (e.g., the MS 115B), a data terminal with a wireless link (not specifically shown), etc. While only two MSs 115 are shown in the wireless communications system 100, many more MSs 115 are usually present within a cell 105. Also, it should be noted that the wireless communications system 100 is usually composed of many such cells 105, BSs 110, etc.

Figure 2A:
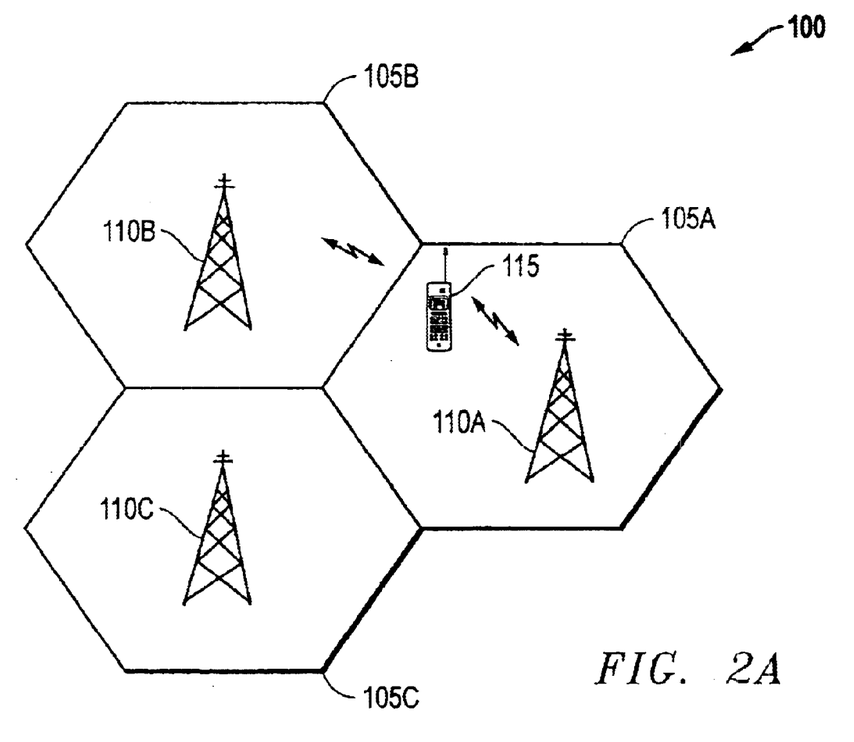
FIG. 2A illustrates another exemplary portion of the exemplary wireless communications system with which the present invention may be advantageously practiced.

With reference now to FIG. 2A, another exemplary portion of the exemplary wireless communications system with which the present invention may be advantageously practiced is illustrated at 100. In this exemplary portion of the exemplary wireless communications system 100, three cells 105 (e.g., cells 105A, 105B, and 105C) are illustrated. It should be understood that there are typically many more such cells 105. Also illustrated are three BSs (e.g., BSs 110A, 110B, and 110C), one for each cell 105. It should be understood that while omnidirectional BSs/cells are illustrated, the present invention is equally applicable to sectorized BSs/cells (e.g., where one BS 110 effectively serves, for example, three (3) cells 105). The MS 115 is illustrated as physically within cell 105A and in communication with the BS 110A, as indicated by the transmission signal therebetween.

However, as indicated by another transmission signal between the MS 115 and the BS 110B, the MS 115 may also be in communication with the BS 110B. Such dual communications or communication switches can occur, for example, during handoff (e.g., soft, hard, etc.), during macrodiversity, etc. Hard handoff is effectuated when an MS (e.g., the MS 115) switches from one BS (e.g., the BS 110A) to another BS (e.g., the BS 110B) without being simultaneously in communication with both. Soft handoff, on the other hand, is effectuated when an MS (e.g., the MS 115) switches from one BS (e.g., the BS 110A) to another BS (e.g., the BS 110B) while being contemporaneously in communication with both, at least temporarily. Macrodiversity occurs when an MS (e.g., the MS 115) is simultaneously in communication with two or more BSs (e.g., the BSs 110A and 110B) and is transceiving essentially similar information so as to improve the probability of ultimately communicating (e.g., receiving and decoding) accurately the intended information, for example.

Figure 2B:
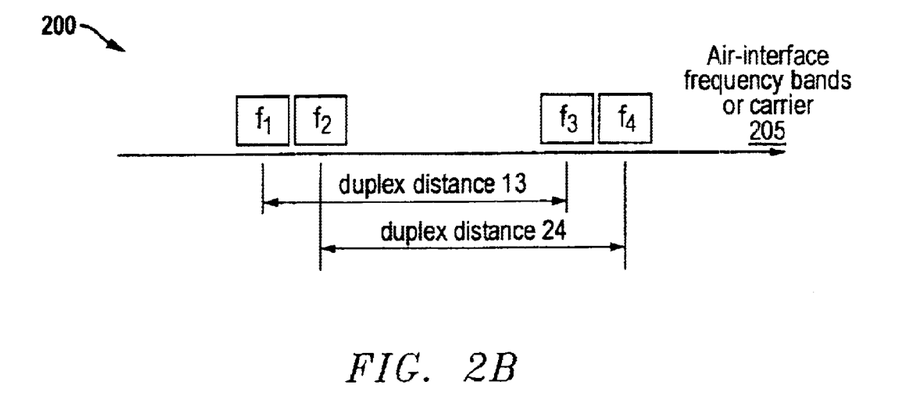
FIG. 2B illustrates an exemplary frequency map of selected carriers as used herein.

With reference now to FIG. 2B, an exemplary frequency map of selected carriers as used herein is illustrated generally at 200. Four exemplary carriers are mapped along an x-axis 205 defined as the frequency bands or carriers of the air interface. The four carriers that are mapped are: $f_1$, $f_2$, $f_3$, and $f_4$. The duplex distances "113" and "24" are also indicated. In the exemplary mapping 200, $f_1$ and $f_2$ are (typically) used as UL frequencies, and $f_3$ and $f_4$ are (typically) used as DL frequencies. Because path loss is lower at lower frequencies, transmission power demands are lower at lower frequencies; consequently, the lower frequencies in frequency division duplex (FDD) systems are often reserved for MSs to prolong their battery life. If the duplex distance does not change during a handover, then it may be termed a "constant duplex distance" (CDD) handover. If, on the other hand, the duplex distance does change during a handover, then it may be termed a "variable duplex distance" (VDD) handover. VDD handovers are more difficult to implement in an MS because designing filters that work well for multiple duplex distances is difficult with today'S technology. Implementing only CDD therefore makes the design of the MS easier. Conversely, enabling VDD typically makes the MS (or any other equipment) more complex.

Figure 3:
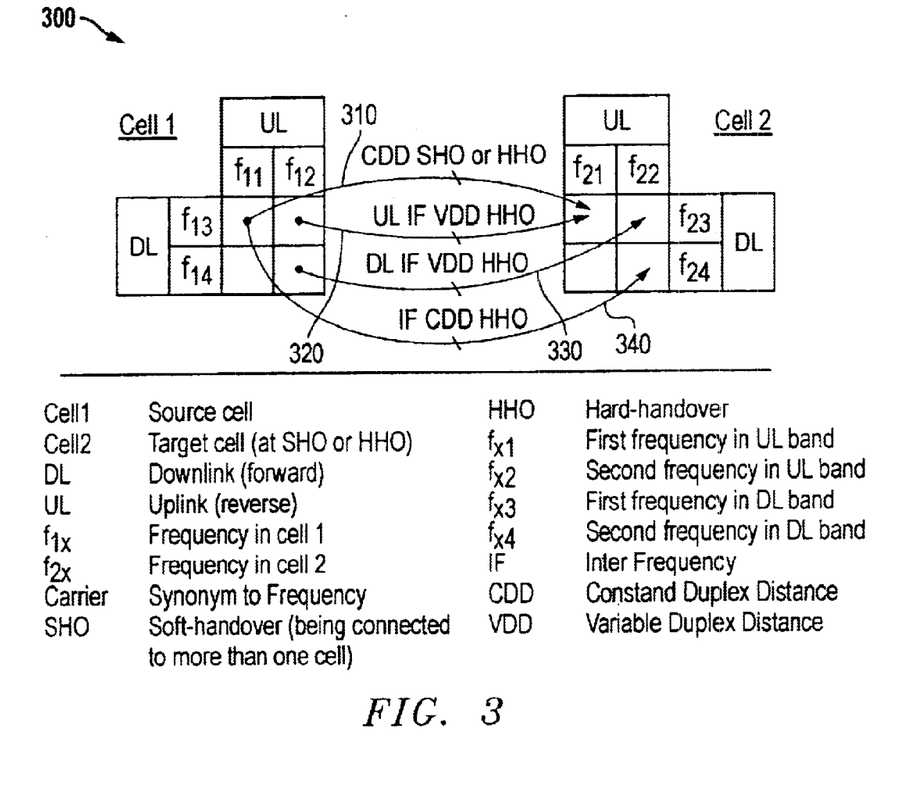
FIG. 3 illustrates a conventional handover frequency chart.

With reference now to FIG. 3, a conventional handover frequency chart is illustrated generally at 300. The chart 300 illustrates uplink (UL) and downlink (DL) frequencies for handovers from a cell 1 to a cell 2. In accordance with the nomenclature used herein, "$f_{xy}$" represents that the $y^{th}$ frequency is being used in cell x. In other words, the first subscript numeral indicates the cell and the second subscript numeral indicates the frequency therein. In principle, handover may be accomplished in four different manners with respect to frequencies: (1) keeping both frequencies [CDD], (2) keeping the DL frequency only [UL IF VDD], (3) keeping the UL frequency only [DL IF VDD], and (4) changing both frequencies [IF CDD]. Continuing now with the chart 300, a conventional soft or hard handover 310 [CDD SHO or HHO], on the other hand, represents a handover of an MS using an UL carrier of $f_{11}$ and a DL carrier of $f_{13}$ in cell 1 and "switching to" an UL carrier of $f_{21}$ and a DL carrier of $f_{23}$ in cell 2. Therefore, the conventional soft or hard handover 310 indicates that both the UL and the DL carrier are identical in both cell 1 and cell 2. In other words, with conventional soft handovers in which an MS is connected to two or more cells contemporaneously, neither the DL nor the UL frequency is changed for or during the handover. A conventional hard handover 320 [UL IF VDD HHO] represents an MS handover from an UL carrier of $f_{12}$ and a DL carrier of $f_{13}$ in cell 1 to switching to an UL carrier of $f_{21}$ and a DL carrier of $f_{23}$ in cell 2. Therefore, for the conventional hard handover 320, the DL frequency remains the same while the UL frequency is changed.

A conventional hard handover 330 [DL IF VDD HHO] represents an MS handover from an UL carrier of $f_{12}$ and a DL carrier of $f_{14}$ in cell 1 to switching to an UL carrier of $f_{22}$ and a DL carrier of $f_{23}$ in cell 2. Therefore, for the conventional hard handover 330, the UL frequency remains the same while the DL frequency is changed. And a conventional hard handover 340 [IF CDD HHO] represents an MS handover from an UL carrier of $f_{11}$ and a DL carrier of $f_{13}$ in cell 1 to switching to an UL carrier of $f_{22}$ and a DL carrier of $f_{24}$ in cell 2. Therefore, for the conventional hard handover 340, both the UL frequency and the DL frequency are changed during/by the hard handover. It should be noted that there is also a fifth case that is not illustrated in the frequency chart 300. The fifth case entails changing both the UL and the DL frequencies while also changing the duplex distance [IF VDD HO]. For example, an MS may engage in a handover from an UL carrier of $f_{11}$ and a DL carrier of $f_{13}$ in cell 1 (i) to switching to an UL carrier of $f_{22}$ and a DL carrier of $f_{2n}$ in cell 2 or (ii) to switching to an UL carrier of $f_{2n}$ and a DL carrier of $f_{24}$ in cell 2. In the former handover there is a third frequency in the DL, and in the latter handover there is a third frequency in the UL.

In summary, existing CDMA systems perform soft handovers only between the same carriers. In other words, soft handovers in existing systems (e.g., those operating in accordance with the IS-95 standard) are performed between the same frequency pairs (DL/UL) (e.g., the same carrier frequency for a DL in cell 1 and cell 2 and the same carrier frequency for an UL in cell 1 and cell 2). Additionally, existing systems (e.g., those operating in accordance with TDMA/GSM-type standards) rely on CDD. Under a CDD regime, the frequency distance between carrier pairs (e.g., between UL and DL frequency pairs) is constant. Furthermore, it should be noted that a drawback to doing hard handovers in current CDMA systems is that the interference system is sub-optimal. In fact, the handover transition from one carrier to another carrier is difficult to handle in CDMA systems, and a probability for dropped calls is higher with hard handover in comparison to soft handover.

Figure 4:
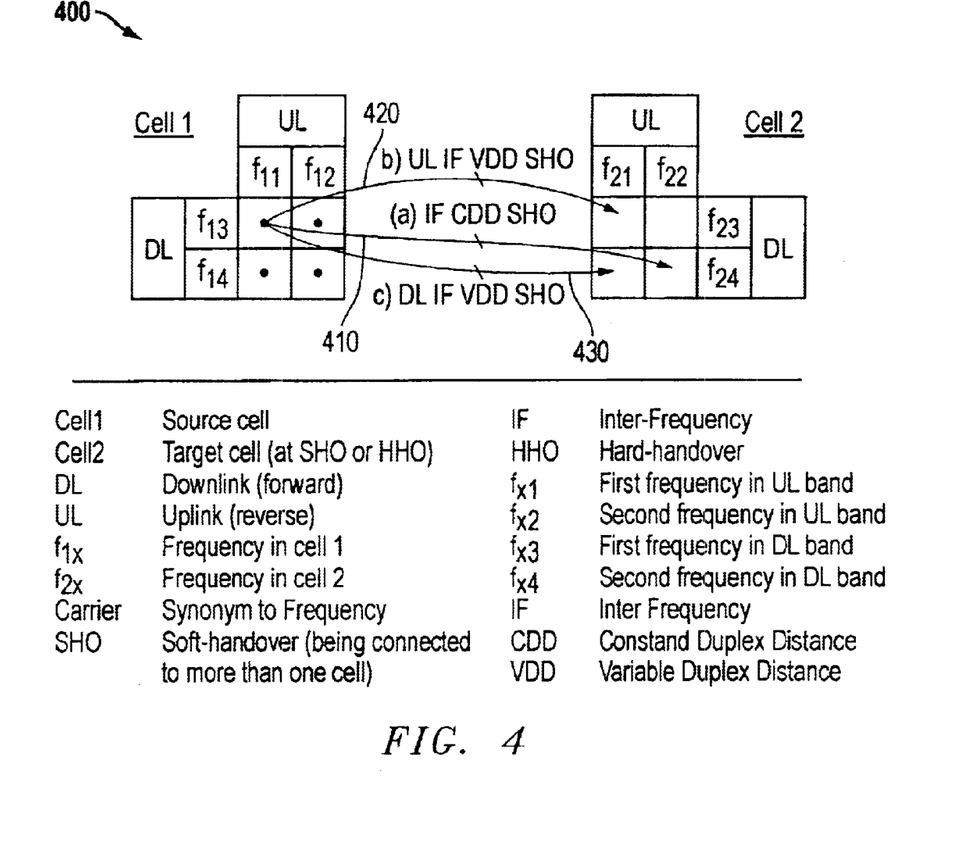
FIG. 4 illustrates an exemplary handover frequency chart in accordance with the present invention.

With reference now to FIG. 4, an exemplary handover frequency chart in accordance with the present invention is illustrated generally at 400. The chart 400 illustrates UL and DL frequencies for handovers from a cell 1 (e.g., a source cell) to a cell 2 (e.g., a target cell) in accordance with the present invention that may be advantageously implemented so as to improve the efficiency of an air-interface. An IF soft handover 410 represents an MS handover from an UL carrier of $f_{11}$ and a DL carrier of $f_{13}$ in cell 1 to switching to an UL carrier of $f_{22}$ and a DL carrier of $f_{24}$ in cell 2. The IF soft handover 410 therefore represents an exemplary CDD handover in which both frequencies are different.

An UL IF soft handover 420 represents an MS handover from an UL carrier of $f_{11}$ and a DL carrier of $f_{13}$ in cell 1 to switching to an UL carrier of $f_{22}$ and a DL carrier of $f_{23}$ in cell 2. The UL IF soft handover 420 therefore represents an exemplary VDD handover in which the DL frequency does not change. In VDD handovers, the frequency difference between the UL and DL carriers in a first cell varies from the frequency difference between the UL and DL carriers in a second cell. Similarly, a DL IF soft handover 430 represents an MS handover from an UL carrier of $f_{11}$ and a DL carrier of $f_{13}$ in cell 1 to switching to an UL carrier of $f_{21}$ and a DL carrier of $f_{24}$ in cell 2. The DL IF soft handover 430 therefore represents an exemplary variable duplex distance (VDD) handover in which the UL frequency does not change.

Other alternatives of the present invention likewise provide flexibility for the air-interface. For example, handovers (e.g., IF (CDD), UL IF (VDD), DL IF (VDD), etc.) may be performed from UL,DL carrier pairs $f_{12}, f_{13}$; $f_{11}, f_{14}$; $f_{12}, f_{14}$ of cell 1 to carrier pairs of cell 2 that are analogous to those described above with reference to the handovers 410, 420, and 430. These three sets of additional variants (in addition to the set described above starting with a communication using an UL carrier of $f_{11}$ and a DL carrier of $f_{13}$ in cell 1 with reference to handovers 410, 420, and 430) may be advantageously utilized to increase the carrier pairs available to be assigned by and used within a wireless communications system (e.g., the wireless communications system 100). The additional combinations of carriers and an ability to have a different number of DL and UL carriers for a given MS, as well as the contemporaneous use thereof, provides the relevant wireless communications system a greater number of options when assigning and using the available carriers both within an individual cell and throughout the system. The greater number of carrier options enables the system to better handle (e.g., potential or actual) interference situations and/or increase the number of users served by the system by increasing the use efficiency of the air-interface. It should be understood that in a typical cell 105 (of FIGS. 1 and 2A, for example), the number of carrier pairs may be greater than two (2) (for a total of four (4) carriers). Consequently, a handover frequency chart for such a cell 105 may contain more carrier frequency pair intersections (e.g., each corresponding to one of the squares) than the four (4) shown in the chart 400.

Figure 5A:
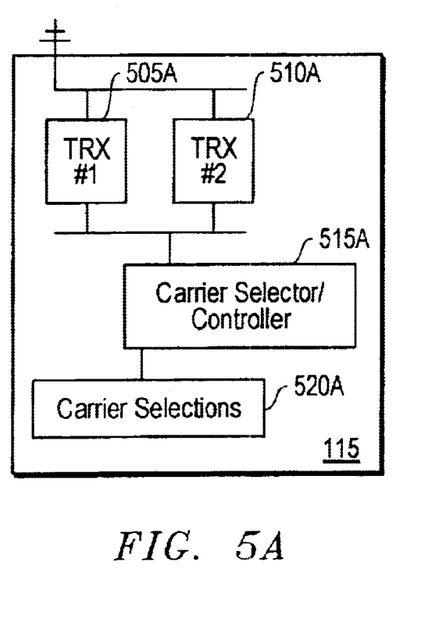
FIG. 5A illustrates a block diagram of an exemplary mobile station in accordance with the present invention.
Figure 5B:
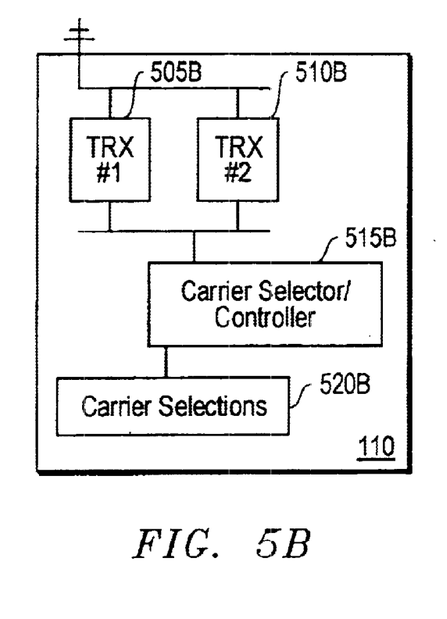
FIG. 5B illustrates a block diagram of an exemplary base station in accordance with the present invention.

With reference now to FIGS. 5A and 5B, block diagrams of an exemplary mobile station and an exemplary base station, respectively, in accordance with the present invention are illustrated at 115 and 110, respectively. In certain embodiments of the present invention, the MS 115 and/or the BS 110 may include at least two transceivers (TRXs) using current technology. For example, if the MS 115 and/or the BS 110 is engaged contemporaneously in two communications (e.g., with a soft handover in accordance with one embodiment of the present invention), then each may advantageously include and employ a separate TRX for each carrier that is being contemporaneously transmitted and/or received on for a given UL or DL channel. Accordingly, a TRX #1 505A/B and a TRX #2 510A/B are illustrated as part of the MS 115 and the BS 110. Connected to the TRXs #1 and #2 505A/B and 510A/B is a carrier selector/controller 515A/B.

The carrier selector/controller 515A/B may be, for example, a separate hard-wired component, a software routine running on a general-purpose processor, a specially-configured digital signal processor (DSP), some combination thereof, etc. In other words, the functions of the carrier selector/controller 515A/B may be effectuated by software, hardware, firmware, etc., or some combination thereof. The carrier selector/controllers 515A/B select the appropriate carrier pairs from the carrier selections block 520A/B. The carrier selections block 520A/B may be stored, for example, in general-purpose memory, temporary registers, memory specially designated to store the carrier selections, etc. The carrier selections 520A/B may permanently store all possible carrier selections, may store only a portion of such possible carrier selections (with new carrier selections being received and stored as necessary), etc. It should be noted that the exemplary block components of FIGS. 5A and 5B may be partially or completely incorporated into conventional circuitry, code, and/or memory, etc. of MSs 115 and BSs 110, as will be apparent to those of ordinary skill in the art after reading and understanding the principles of the present invention.

The carrier selector/controller 515A/B (especially the carrier selector/controller 515B of the BS 110) may control the selection and use of carriers (e.g., carrier pairs) based on current operating conditions (e.g., measured interference), general frequency usage goals (e.g., established frequency usage plans) for the wireless communications system, etc. The carrier selector/controller 515B may, for example, receive instructions from another node in the wireless communications network 100 (e.g., a radio network controller (RNC), a mobile services switching center (MSC), a management and control node, etc. (none of which are explicitly shown)). The carrier selector/controller 515A of the MS 115 may, for example, receive instructions from the carrier selector/controller 515B of the BS 110. In operation, the carrier selector/controller 515A/B (e.g., based on received, developed, negotiated, etc. instructions) selects the appropriate carriers (e.g., a DL and an UL carrier pair for each communication to each cell) and retrieves them from the carrier selections 520A/B. The carrier selector/controller 515A/B may thereafter control the appropriate TRXs #1 and #2 505A/B and 510A/B to transmit/receive using the selected carriers at the appropriate times.

Figure 5C:
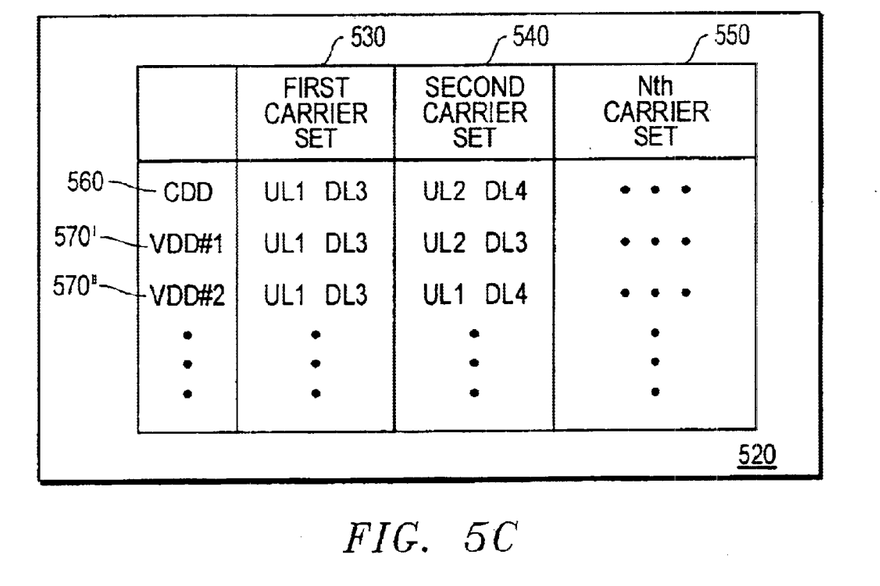
FIG. 5C illustrates a table of an exemplary data structure of exemplary carrier selections in accordance with the present invention.

With reference now to FIG. 5C, a table of an exemplary data structure of exemplary carrier selections in accordance with the present invention is illustrated generally at 520. The carrier selections 520 include columns for a first carrier set 530, a second carrier set 540, and an $N^{th}$ carrier set 550. (It should be noted that single carrier pairs that are identical for each carrier set are also possible.) The $N^{th}$ carrier set 550 represents that many additional carrier sets are possible in accordance with the principles of the present invention (e.g., when more than two (2) carriers for each of the UL and DL channels are available). An exemplary CDD entry 560 indicates that a soft handover of an MS using an "UL 1" and a "DL 3" carrier pair in a source cell results in the MS using an "UL 2" and a "DL 4" carrier pair in a target cell. Also, an exemplary VDD#1 entry 570' indicates that a soft handover of an MS using an "UL 1" and a "DL 3" carrier pair in a source cell results in the MS using an "UL 2" and a "DL 3" carrier pair in a target cell. Furthermore, an exemplary VDD#2 entry 570" indicates that a soft handover of an MS using an "UL 1" and a "DL 3" carrier pair in a source cell results in the MS using an "UL 1" and a "DL 4" carrier pair in a target cell. As represented by the vertical ellipses, the carrier sets 530, 540, and 550 of the carrier selections 520 (of FIG. 5C) may, and typically do, include many alternative CDD and VDD entries. These alternative CDD and VDD entries may arise, for example, when more than two (2) carriers for each of the UL and DL channels are available, when alternative frequency pairs (e.g., the UL,DL carrier pairs $f_{12}$, $f_{13}$; $f_{11}$, $f_{14}$; $f_{12}$, $f_{14}$ of cell 1 of the chart 400 (of FIG. 4)) are utilized, etc.

Figure 5D:
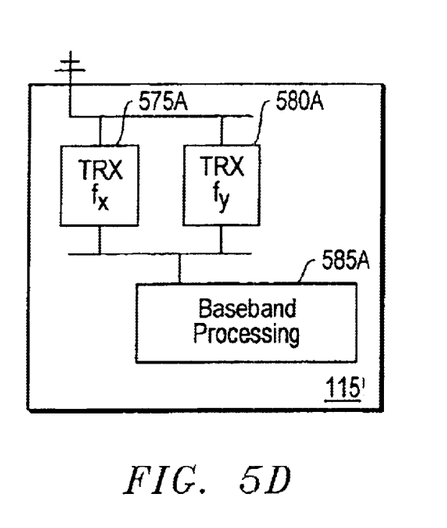
FIGS. 5D and 5E illustrate block diagrams of two other exemplary mobile stations in accordance with the present invention.
Figure 5E:
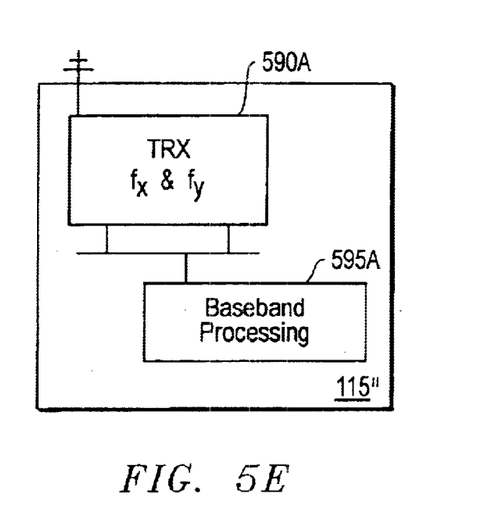

With reference now to FIGS. 5D and 5E, block diagrams of two other exemplary mobile stations in accordance with the present invention are illustrated at 115' and 115", respectively. The MS 115' is illustrated with two TRXs 575A and 580A that receive on frequencies $f_x$ and $f_y$, respectively. A common baseband processing part 585A processes the separately received frequencies. The MS 115", on the other hand, is illustrated with a wideband TRX 590A that transceives on a sufficiently wide frequency band so as to cover both frequency $f_x$ and frequency $f_y$. A baseband processing part 595A selects and processes the received frequencies.

Figure 5F:
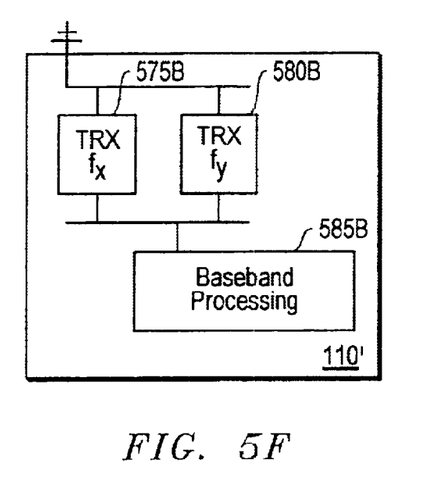
FIGS. 5F and 5G illustrate block diagrams of two other exemplary base stations in accordance with the present invention.
Figure 5G:
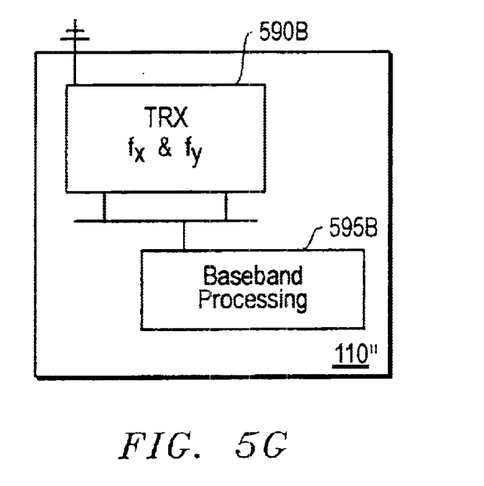

With reference now to FIGS. 5F and 5G, block diagrams of two other exemplary base stations in accordance with the present invention are illustrated at 110' and 110", respectively. The base station 110' is illustrated with two TRXs 575B and 580B that receive on frequencies $f_x$ and $f_y$, respectively. A common baseband processing part 585B processes the separately received frequencies. The base station 110", on the other hand, is illustrated with a wideband TRX 590B that transceives on a sufficiently wide frequency band so as to cover both frequency $f_x$ and frequency $f_y$. A baseband processing part 595B selects and processes the received frequencies.

Figure 6:
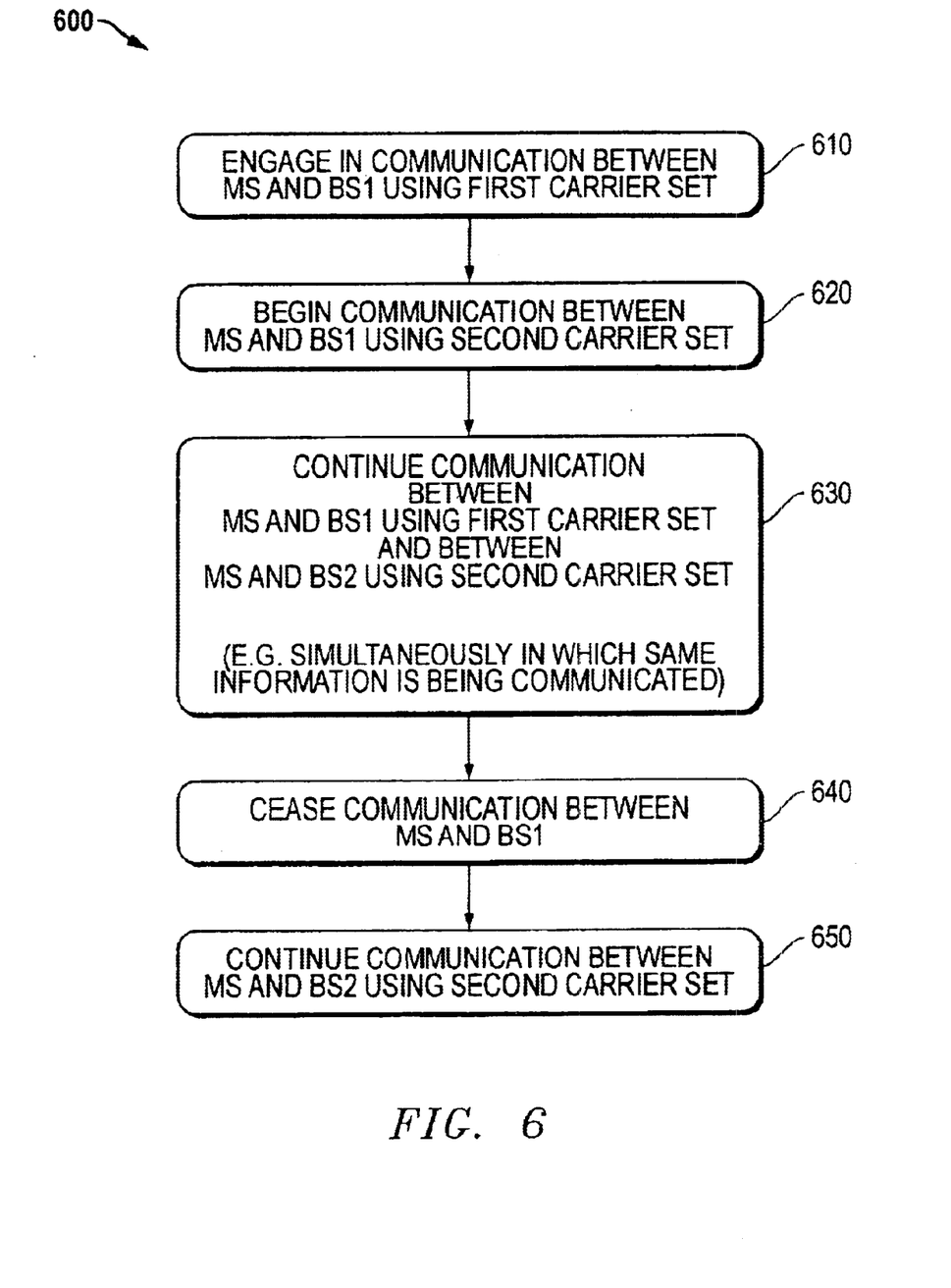
FIG. 6 illustrates a flowchart of an exemplary method in accordance with the present invention.

With reference now to FIG. 6, a flowchart of an exemplary method in accordance with the present invention is illustrated generally at 600. An MS (e.g., the MS 115 (of FIGS. 1 and 2A)) is engaged in a communication with a first base station (e.g, the BS 110A) using a first carrier set (step 610). Another communication is started between the MS and a second base station (e.g., the BS 110B) using a second carrier set (step 620). The first carrier set may differ from the second carrier set (e.g, by having only a different UL frequency, by having only a different DL frequency, or by having both a different UL and a different DL frequency). The two communications, between the MS and the first base station using the first carrier set and between the MS and the second base station using the second carrier set, may be continued (step 630). The two communications may, for example, be continued substantially contemporaneously and/or contain substantially similar or identical information (e.g., as in a soft handover of the MS from the first to the second base station, as in macrodiversity, etc.). Subsequently (e.g., after signal strength has been determined to be acceptable with respect to the second base station), the communication between the MS and the first base station may be ceased or terminated (step 640) (e.g., if/when the signal strength with respect to the first base station is sufficiently weak). It should be noted that in alternative embodiments (e.g., a macrodiversity embodiment), the communication between the MS and the second base station may instead be ceased or terminated (e.g., if/when the signal strength with respect to the second base station is sufficiently weak). The other communication between the MS and the second base station using the second carrier set may then be continued (step 650). When the carrier sets differ (e.g., in a CDD sense, a VDD sense, etc.), the wireless communications system (e.g., the wireless communications system 100) advantageously gains greater flexibility in the assignment and use of frequency channels, thereby increasing the efficient utilization of the air-interface.

In an alternative hard handover embodiment in accordance with the present invention, a handover of an MS 115 from the BS 110A to the BS 110B is effectuated in which, for example, one frequency (e.g., either UL or DL) is unchanged while the other frequency is changed. In other words, in this alternative embodiment, a hard handover is implemented in which only one of the two frequencies in a frequency pair of a source cell is changed when the hard handover is completed to the target cell. For example, with reference to the chart 400 (of FIG. 4), a hard handover of an MS from an UL carrier of $f_{11}$ and a DL carrier of $f_{13}$ in cell 1 to an UL carrier of $f_{22}$ and a DL carrier of $f_{23}$ in cell 2 changes only one frequency of the frequency pair. This hard handover therefore represents an exemplary VDD hard handover in which the DL frequency does not change. Alternatively, only the UL frequency may not change. In VDD hard handovers, the frequency difference between the UL and DL carriers in a first cell varies from the frequency difference between the UL and DL carriers in a second cell. This VDD hard handover aspect of the present invention also provides a greater frequency assignment and use flexibility to the wireless communications system 100, thereby improving the efficiency of the air-interface.

Although preferred embodiment(s) of the methods, systems, and arrangements of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method in a wireless communications system for improving air-interface efficiency, comprising the steps of:

engaging in a first communication between a remote communication station and a first communication station using a first carrier set;

beginning a second communication between said remote communication station and a second communication station using a second carrier set;

wherein said first carrier set comprises a first uplink carrier and a first downlink carrier, and said second carrier set comprises a second uplink carrier and said first downlink carrier;

wherein said first carrier set is different from said second carrier set; and wherein, for the case of communications being handed over to said second carrier set by means of a hard handover, one carrier of the first carrier set and one carrier of the second carrier set have substantially identical carrier frequencies.

2. The method according to claim 1, wherein the wireless communications system operates in accordance with at least one of a code division multiple access (CDMA) technology, a time division multiple access (TDMA) technology, and the Global System for Mobile Communications (GSM) standard.

3. The method according to claim 1, wherein said first communication station is associated with a first cell and said second communication station is associated with a second cell.

4. The method according to claim 1, further comprising:
ceasing said first communication between said remote communication station and said first communication station; and
continuing said second communication between said remote communication station and said second communication station using said second carrier set.

5. The method according to claim 4, whereby a handover involving variable duplex distance is thereby effectuated.

6. The method according to claim 1, wherein the hard handover comprises:
terminating said first communication and thereby interrupting an information dialogue involving said remote communication station after a first data point and before a second data point of said information dialogue; and
initiating the second communication between said remote communication station and the second communication station using the second carrier set, said second communication including said second data point of said information dialogue.

7. The method according to claim 6, whereby a hard handover involving variable duplex distance is thereby effectuated.

8. The method according to claim 1, further comprising:
maintaining said first communication between said remote communication station and said first communication station using said first carrier set and said second communication between said remote communication station and said second communication station using said second carrier set, said first communication and said second communication containing substantially identical information.

9. The method according to claim 8, wherein said first communication and said second communication contain substantially identical information substantially contemporaneously.

10. The method according to claim 8, whereby a soft handover is thereby effectuated.

11. The method according to claim 10, wherein said first carrier set comprises a first uplink carrier and a first downlink carrier, and said second carrier set comprises a second uplink carrier and a second downlink carrier.

12. A wireless communications system for improving air-interface efficiency, comprising:

means for engaging in a first communication between a remote communication station and a first communication station using a first carrier set;

means for beginning a second communication between said remote communication station and a second communication station using a second carrier set;

wherein said first carrier set comprises a first uplink carrier and a first downlink carrier, and said second carrier set comprises a second uplink carrier and said first downlink carrier;

wherein said first carrier set is different from said second carrier set; and wherein, for the case of communications being handed over to said second carrier set by means of a hard handover, one carrier of the first carrier set and one carrier of the second carrier set have substantially identical carrier frequencies.

13. The wireless communications system according to claim 12, wherein the wireless communications system operates in accordance with at least one of a code division multiple access (CDMA) technology, a time division multiple access (TDMA) technology, and the Global System for Mobile Communications (GSM) standard.

14. The wireless communications system according to claim 12, wherein said first communication station is associated with a first cell and said second communication station is associated with a second cell.

15. The wireless communications system according to claim 12, further comprising:
means for ceasing said first communication between said remote communication station and said first communication station; and
means for continuing said second communication between said remote communication station and said second communication station using said second carrier set.

16. The wireless communications system according to claim 15, wherein the means are means for effectuating handover involving variable duplex distance.

17. The wireless communication system according to claim 12, wherein the hard handover comprises:
terminating said first communication and thereby interrupting said information dialogue after a first data point and before a second data point of said information dialogue; and
initiating a second communication between said remote communication station and a second communication station using a second carrier set, said second carrier set including one, but not both, of said uplink carrier and said downlink carrier, said second communication including said second data point of said information dialogue.

18. The wireless communications system according to claim 17, wherein the means are means for effectuating a variable duplex distance hard handoff so that said remote communication station is in wireless communication with said second communication station using a second carrier set.

19. The wireless communications system according to claim 12, further comprising:
means for maintaining said first communication between said remote communication station and said first communication station using said first carrier set and said second communication between said remote communication station and said second communication station using said second carrier set, said first communication and said second communication containing substantially identical information.

20. The wireless communications system according to claim 19, wherein said first communication and said second communication contain substantially identical information substantially contemporaneously.

21. The wireless communications system according to claim 19, wherein the means are means for effectuating soft handover.

22. The wireless communications system according to claim 21, wherein said first carrier set comprises a first uplink carrier and a first downlink carrier, and said second carrier set comprises a second uplink carrier and a second downlink carrier.

23. An arrangement for improving air-interface efficiency, comprising:
   a transceiving unit, said transceiving unit adapted for transmitting and receiving using a plurality of carriers;
   a channel data structure, said channel data structure including a plurality of carrier sets;
   a carrier effectuator, said carrier effectuator coupled to said transceiving unit and said channel data structure, said carrier effectuator adapted for selecting at least one carrier set from said plurality of carrier sets of said channel data structure and for controlling said transceiving unit to utilize said at least one carrier set;
   wherein said first carrier set comprises a first uplink carrier and a first downlink carrier, and said second carrier set comprises a second uplink carrier and said first downlink carrier;
   wherein said transceiving unit transmits substantially contemporaneously using said first carrier set and said second carrier set, said first carrier set differing from said second carrier set; and
   wherein for the case of communications being handed over to said second carrier set by means of a hard handover; one carrier of the first carrier set and one carrier of the second carrier set have substantially identical carrier frequencies.

24. The arrangement according to claim 23, whereby a handover involving variable duplex distance is thereby effectuated.

25. The arrangement according to claim 23, wherein the arrangement operates in accordance with at least one of a code division multiple access (CDMA) technology, a time division multiple access (TDMA) technology, and the Global System for Mobile Communications (GSM) standard.

26. The arrangement according to claim 23, wherein the hard handover comprises:
   terminating said first communication and thereby interrupting an information dialogue involving said remote communication station after a first data point and before a second data point of said information dialogue; and
   initiating the second communication between said remote communication station and the second communication station using the second carrier set, said second communication including said second data point of said information dialogue.

27. The arrangement according to claim 26, whereby a hard handover involving variable duplex distance is thereby effectuated.

28. The arrangement according to claim 23, wherein the arrangement comprises a mobile station.

29. The arrangement according to claim 23, wherein the arrangement comprises a base station.

30. The arrangement according to claim 23, wherein said transceiving unit comprises at least two transceivers.

31. The arrangement according to claim 23, wherein said channel data structure is stored in a memory.

32. The arrangement according to claim 23, wherein said carrier effectuator comprises, at least partly, software instructions code.

33. The arrangement according to claim 23, wherein said carrier effectuator comprises, at least partly, a data processor.

34. The arrangement according to claim 23, wherein said transceiving unit transmits substantially identical information during a soft handover procedure substantially contemporaneously using said first carrier set and said second carrier set.

35. The arrangement according to claim 34, wherein said first carrier set comprises a first uplink carrier and a first downlink carrier, and said second carrier set comprises a second uplink carrier and a second downlink carrier.

36. An arrangement for improving air-interface efficiency, comprising:
   a transceiving unit, said transceiving unit adapted for transmitting and receiving using a plurality of carriers;
   a channel data structure, said channel data structure including a plurality of carrier sets, a first carrier set of said plurality of carrier sets including a first carrier and a second carrier, a second carrier set of said plurality of carrier sets including said first carrier and a third carrier;
   a carrier effectuator, said carrier effectuator coupled to said transceiving unit and said channel data structure, said carrier effectuator adapted for selecting at least one carrier set from said plurality of carrier sets of said channel data structure and for controlling said transceiving unit to utilize said at least one carrier set;
   and wherein said transceiving unit is further adapted for transceiving using said first carrier set prior to or during a handover and for transceiving using said second carrier set after or during a handover.

37. The arrangement according to claim 36, wherein the arrangement comprises a mobile station.

38. The arrangement according to claim 36, wherein the arrangement comprises a base station.

39. The arrangement according to claim 36, wherein the arrangement operates in accordance with at least one of a code division multiple access (CDMA) technology, a time division multiple access (TDMA) technology, and the Global System for Mobile Communications (GSM) standard.

40. The arrangement according to claim 36, wherein said handover is a hard handover.

41. The arrangement according to claim 36, wherein said handover is a soft handover.

42. The arrangement according to claim 36, wherein said first carrier is an uplink carrier and said second and third carriers are downlink carriers.

43. The arrangement according to claim 36, wherein said first carrier is a downlink carrier and said second and third carriers are uplink carriers.

44. The arrangement according to claim 36, wherein said transceiving unit is further adapted for transceiving using both said first carrier set and said second carrier set during a handover.

45. A method in a wireless communications system for improving air-interface efficiency, comprising the steps of:
   engaging in a first communication between a remote communication station and a first communication station using a first carrier set;

beginning a second communication between said remote communication station and a second communication station using a second carrier set;

wherein said first carrier set comprises a first uplink carrier and a first downlink carrier, and said second carrier set comprises said first uplink carrier and a second downlink carrier;

wherein said first carrier set is different from said second carrier set; and wherein, for the case of communications being handed over to said second carrier set by means of a hard handover, one carrier of the first carrier set and one carrier of the second carrier set have substantially identical carrier frequencies.

46. A wireless communications system for improving air-interface efficiency, comprising:

means for engaging in a first communication between a remote communication station and a first communication station using a first carrier set;

means for beginning a second communication between said remote communication station and a second communication station using a second carrier set;

wherein said first carrier set comprises a first uplink carrier and a first downlink carrier, and said second carrier set comprises a second uplink carrier and a second downlink carrier;

wherein said first carrier set is different from said second carrier set; and wherein, for the case of communications being handed over to said second carrier set by means of a hard handover, one carrier of the first carrier set and one carrier of the second carrier set have substantially identical carrier frequencies.

47. An arrangement for improving air-interface efficiency, comprising:

a transceiving unit, said transceiving unit adapted for transmitting and receiving using a plurality of carriers;

a channel data structure, said channel data structure including a plurality of carrier sets;

a carrier effectuator, said carrier effectuator coupled to said transceiving unit and said channel data structure, said carrier effectuator adapted for selecting at least one carrier set from said plurality of carrier sets of said channel data structure and for controlling said transceiving unit to utilize said at least one carrier set;

wherein said first carrier set comprises a first uplink carrier and a first downlink carrier, and said second carrier set comprises said first uplink carrier and a second downlink carrier;

wherein said transceiving unit transmits substantially contemporaneously using said first carrier set and said second carrier set, said first carrier set differing from said second carrier set; and wherein for the case of communications being handed over to said second carrier set by means of a hard handover; one carrier of the first carrier set and one carrier of the second carrier set have substantially identical carrier frequencies.

* * * * *